United States Patent
Coskun et al.

(10) Patent No.: US 7,831,258 B2
(45) Date of Patent: Nov. 9, 2010

(54) METHOD, SYSTEM AND APPARATUS FOR PARTIAL ELECTRONIC MESSAGE FORWARDING

(75) Inventors: Risvan Coskun, Ottawa (CA); Arun Munje, Kanata (CA)

(73) Assignee: Research In Motion Limited, Waterloo (CA)

( * ) Notice: Subject to any disclaimer, the term of this patent is extended or adjusted under 35 U.S.C. 154(b) by 663 days.

(21) Appl. No.: 11/364,480

(22) Filed: Feb. 28, 2006

(65) Prior Publication Data

US 2007/0203992 A1 Aug. 30, 2007

(51) Int. Cl.
*H04W 4/00* (2009.01)
(52) U.S. Cl. ............... 455/456; 455/412.1; 455/414.1; 709/206; 709/207
(58) Field of Classification Search .................. None
See application file for complete search history.

(56) References Cited

U.S. PATENT DOCUMENTS

| 6,073,142 | A | * | 6/2000 | Geiger et al. ............... 715/205 |
| 7,136,897 | B1 | | 11/2006 | Raghunandan |
| 2002/0016818 | A1 | | 2/2002 | Kirani et al. |
| 2003/0110224 | A1 | | 6/2003 | Cazier et al. |
| 2005/0038863 | A1 | | 2/2005 | Onyon et al. |
| 2005/0044158 | A1 | | 2/2005 | Malik |
| 2005/0108636 | A1 | | 5/2005 | Sylthe et al. |

FOREIGN PATENT DOCUMENTS

| WO | WO 03/026235 A1 | 3/2003 |
| WO | WO 2005/083586 A2 | 9/2005 |

OTHER PUBLICATIONS

European Search Report; European Patent Office; May 16, 2006; 3 pages.
PCT Notification Concerning Transmittal of International Preliminary Report on Patentability; Patent Cooperation Treaty; Sep. 12, 2008; 18 pages.
PCT International Search Report and Written Opinion; 14 pages, May 24, 2007.

* cited by examiner

*Primary Examiner*—Vincent P Harper
*Assistant Examiner*—Mazda Sabouri
(74) *Attorney, Agent, or Firm*—The Danamraj Law Group, P.C.

(57) ABSTRACT

An electronic message server (400) including a message receipt module (408) operable to receive at least one electronic message (500) having a message size from at least one sender (402); a message size comparison module (410) operable to compare the message size to at least one message size limit; a message parsing module (412) operable to parse at least one message having a message size larger than at least one message size limit into at least a first message portion (504) and a second message portion (506); a message portion forwarding module (414) operable to forward the first message portion (504) to a mobile communication device (116) via a wireless link; and a message portion return module (416) operable to return the second message portion (506) to the sender (402).

20 Claims, 6 Drawing Sheets

METHOD, SYSTEM AND APPARATUS FOR PARTIAL ELECTRONIC MESSAGE FORWARDING

TECHNICAL FIELD OF THE APPLICATION

The present disclosure generally relates to wireless packet data service networks. More particularly, and not by way of any limitation, the present disclosure is directed to a mobile communications device and related data service network employing a method, apparatus and system for partial forwarding of electronic messages.

BACKGROUND

The present disclosure is directed toward efficient utilization of wireless bandwidth between a network and a mobile communication device. The bandwidth available for wireless transmission of messages is limited. It is, therefore, desirable to restrict or limit the transmission of extraneous or unnecessary data over a wireless network in order to conserve and optimize available resources. To this end, certain wireless messaging networks impose message size limitations restricting the maximum size of an electronic message transmitted over the wireless network.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system and method of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

The present disclosure relates to a device, method and system for illustrating partial forwarding of electronic messages within a wireless packet data service network. According to a first aspect, the present disclosure relates to an electronic message server. The server includes a message receipt module operable to receive at least one electronic message having a message size from at least one sender; a message size comparison module operable to compare the message size to at least one message size limit; a message parsing module operable to parse at least one message having a message size larger than at least one message size limit into at least a first message portion and a second message portion; a message portion forwarding module operable to forward the first message portion to a mobile communication device via a wireless link; and a message portion return module operable to return the second message portion to the sender.

In certain embodiments, the electronic message is received via the internet. In certain embodiments, the electronic message is an electronic mail message. In certain embodiments, at least one message size limit is associated with the mobile communication device. In certain embodiments, the message parsing module is operable to parse the electronic message into at least a first message portion, a second message portion and a third message portion. In certain embodiments, the message portion return module is operable to return the second message portion and third message portion to the sender. In certain embodiments, the wireless link is selected from a cellular link, a WiFi link, a Bluetooth link, a Zigbee/IEEE 802.15.4 link and an infrared link.

According to a second aspect, the present disclosure relates to a method of forwarding messages to a mobile communication device. The method includes the steps of receiving from at least one sender at least one electronic message having a message size; comparing the message size to at least one message size limit; parsing at least one message having a message size larger than at least one message size limit into at least a first message portion and a second message portion; forwarding the first message portion to a mobile communication device via a wireless link; and returning the second message portion to the sender.

According to a third aspect, the present disclosure relates to mobile communication system. The system includes means for receiving at least one electronic message having a message size, from at least one sender; means for comparing the message size to at least one message size limit; means for parsing at least one message having a message size larger than at least one message size limit into at least a first message portion and a second message portion; means for forwarding the first message portion to a mobile communication device via a wireless link; and means for returning the second message portion to the sender.

Figure 1:
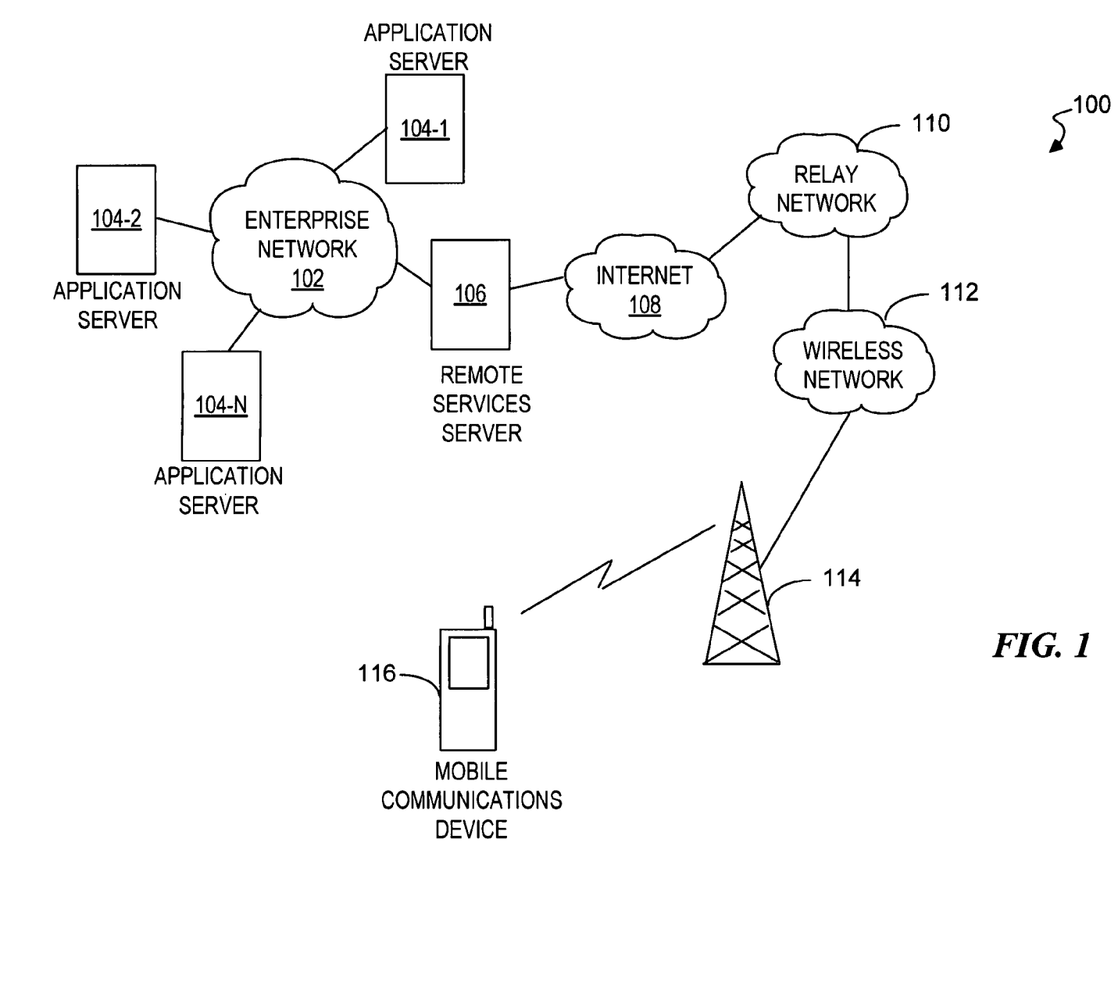
FIG. 1 depicts an exemplary network environment including a wireless packet data service network wherein an embodiment of the present disclosure may be practiced.

Referring now to the drawings, and more particularly to FIG. 1, depicted therein is an exemplary network environment 100 including a wireless packet data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, $i=1, 2, \ldots, N$, with respect to the services supported in the enterprise network 102.

Additionally, a remote services server 106 may be interfaced with the enterprise network 102 for enabling a corporate user to access or effectuate any of the services from a remote location using a suitable mobile communications device 116. A secure communication link with end-to-end encryption may be established that is mediated through an external IP network, i.e., a public packet-switched network such as the Internet 108, as well as the wireless packet data service network 112 operable with Mobile communications device 116 via suitable wireless network infrastructure that includes a base station (BS) 114. In one embodiment, a trusted relay network 110 may be disposed between the Internet 108 and the infrastructure of wireless packet data service network 112. By way of example, mobile communications device 116 may be a data-enabled handheld device capable of receiving and sending messages, web browsing, interfacing with corporate application servers, et cetera.

For purposes of the present disclosure, the wireless packet data service network 112 may be implemented in any known or heretofore unknown mobile communications technologies and network protocols. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

Figure 2:
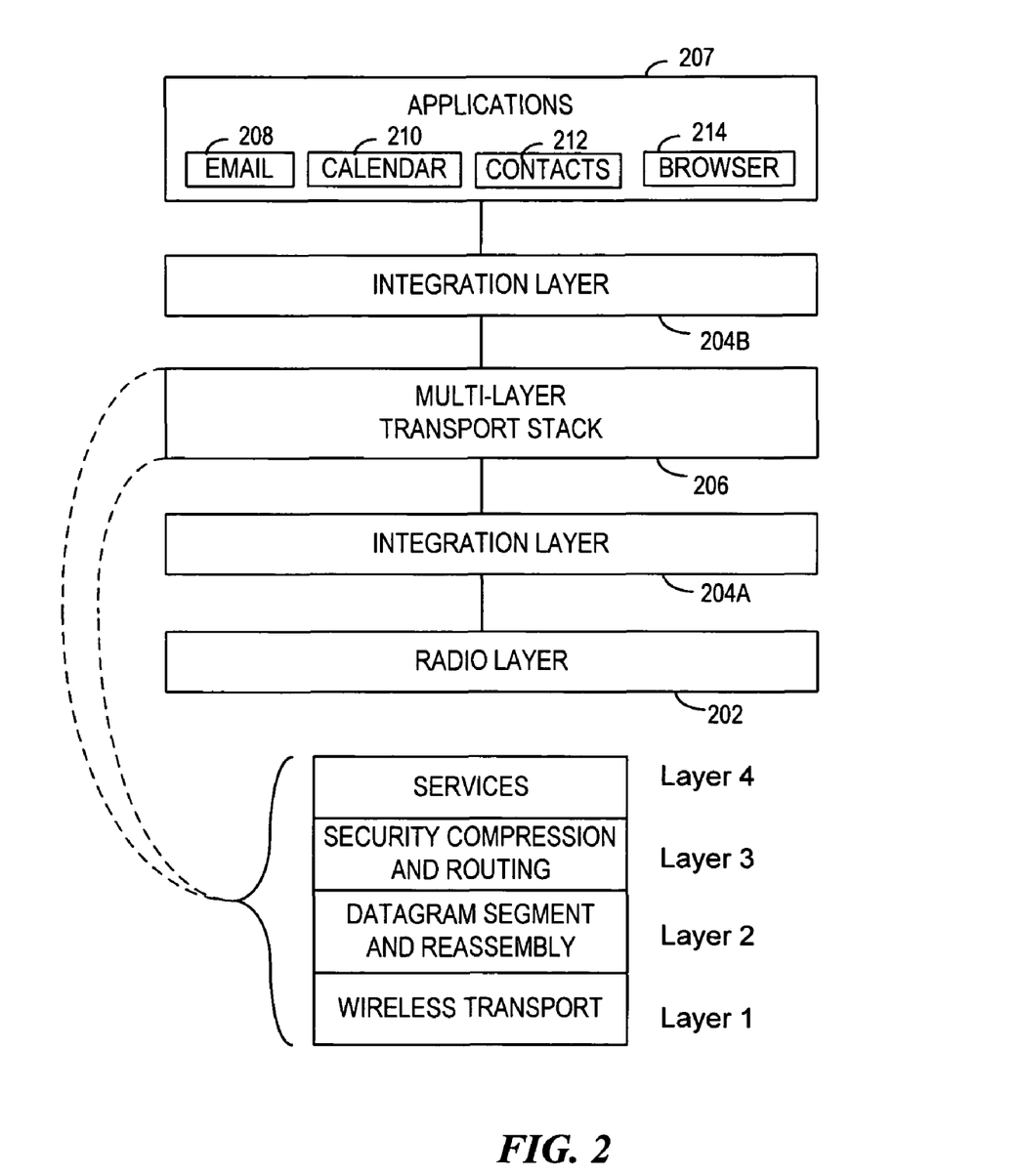
FIG. 2 depicts a software architectural view of a mobile communications device operable to communicate within a wireless packet data service network according to one embodiment.

FIG. 2 depicts a software architectural view of a mobile communications device according to one embodiment. A multi-layer transport stack (TS) 206 is operable to provide a generic data transport protocol for any type of corporate data, including email, via a reliable, secure and seamless continuous connection to a wireless packet data service network. As illustrated in this embodiment, an integration layer 204A is operable as an interface between the radio layer 202 and the transport stack 206 of mobile communications device 116. Likewise, another integration layer 204B is provided for interfacing between the transport stack 206 and the user applications 207 supported on the mobile communications device 116, e.g., email 208, calendar/scheduler 210, contact management 212 and browser 214. Although not specifically shown, the transport stack 206 may also be interfaced with the operating system of mobile communications device 116. In another implementation, the transport stack 206 may be provided as part of a data communications client module operable as a host-independent virtual machine on a mobile device.

The bottom layer (Layer 1) of the transport stack 206 is operable as an interface to the wireless network's packet layer. Layer 1 handles basic service coordination within the exemplary network environment 100 shown in FIG. 1. For example, when a mobile communications device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communications device. The remaining two layers of the transport stack 206, Layer 2 and Layer 3, are responsible for datagram segmentation/reassembly and security, compression and routing, respectively.

Figure 3:
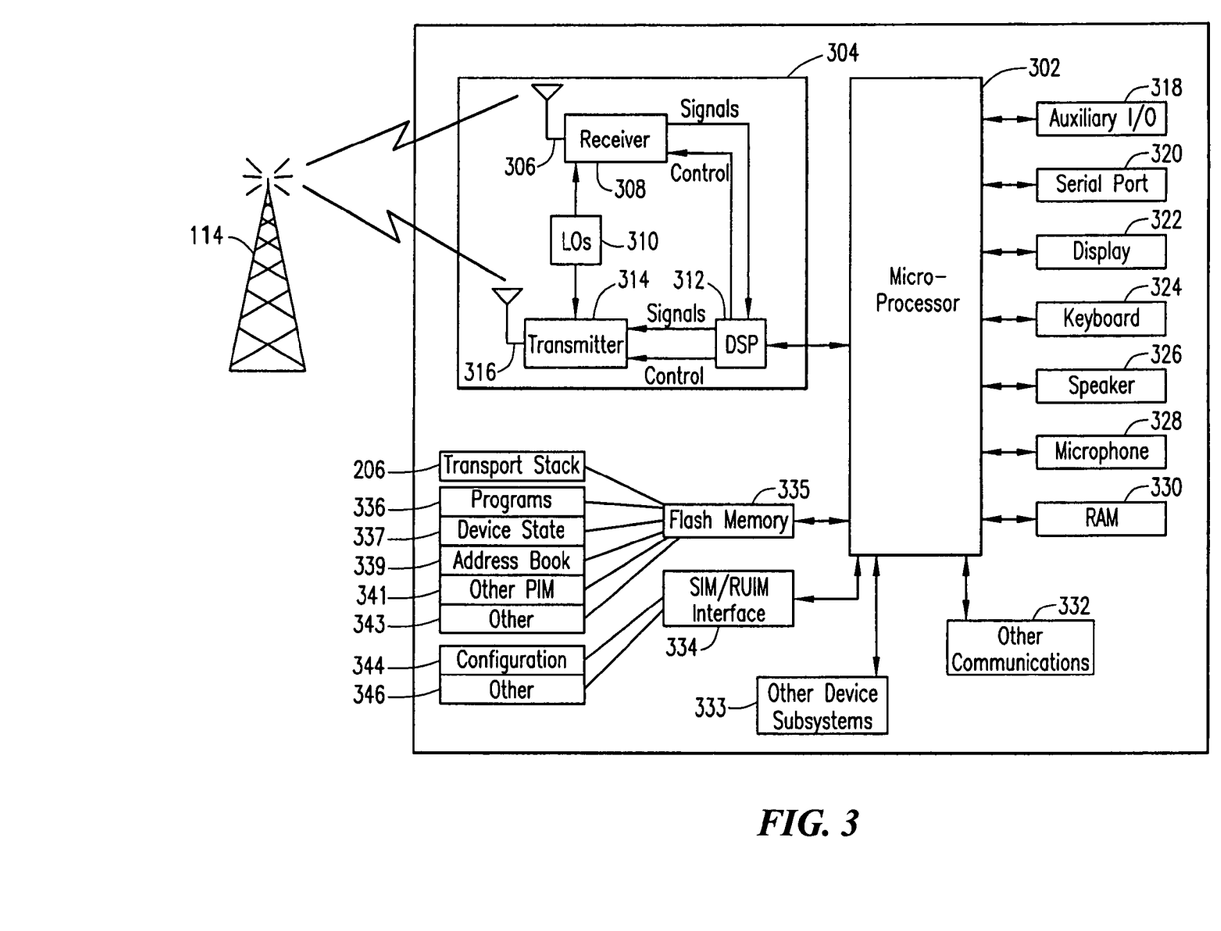
FIG. 3 depicts a block diagram of a mobile communications device operable to communicate within a wireless packet data service network according to one embodiment.

FIG. 3 depicts a block diagram of a mobile communications device according to one embodiment. It will be recognized by those skilled in the art upon reference hereto that although an embodiment of mobile communications device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of Mobile communications device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communications device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343.

Figure 4:
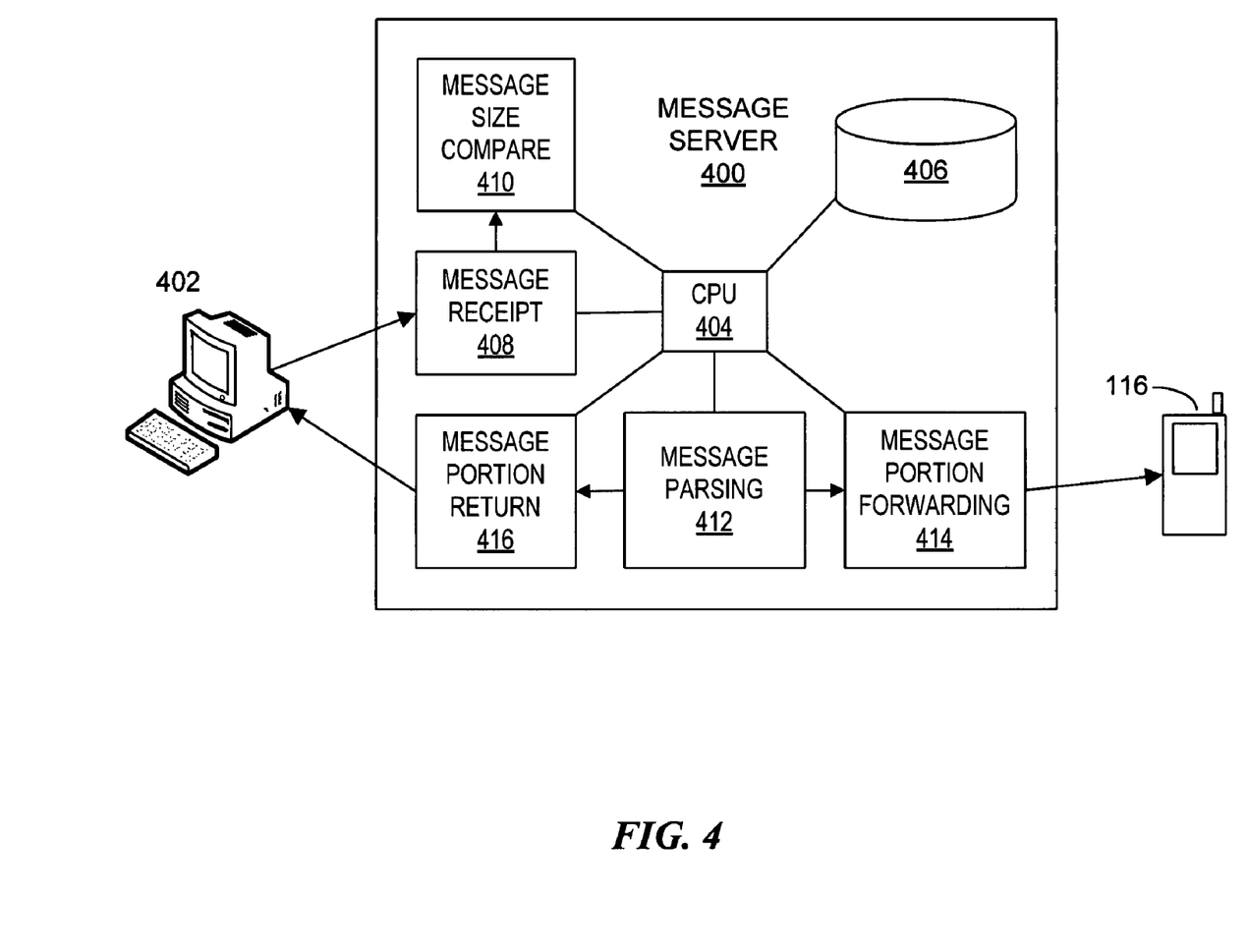
FIG. 4 depicts an electronic message server operable to effectuate partial forwarding of electronic messages according to one embodiment.

FIG. 4 depicts a message server 400 according to one aspect of the present disclosure. Message server 400, disposed between a sender 402 and a mobile communication device 116, incorporates a central processing unit 404, a memory module 406, a message receipt module 408, a message size comparison module 410, a message parsing module 412, a message portion forwarding module 414 and a message portion return module 416. Generally, modules 408, 410, 412, 414, 416 will be implemented as software routines resident in a memory such as memory module 406. In certain embodiments, one or more of modules 408, 410, 412, 414, 416 may represent a separate and independent physical module. Further, although modules 408, 410, 412, 414, 416 are shown as being disposed within a common message server 400, those of skill in the art will recognize that all or a portion of modules 408, 410, 412, 414, 416 may be disposed within separate operational units, which may be located at separate geographical locations.

Central processing unit 404 coordinates and controls the operation of 400 and its various modules. Memory module 406 stores information required by modules 408, 410, 412, 414, 416. Message receipt module 408 receives incoming messages, including but not limited to messages originating from sender 402. Message size comparison module 410 compares the size of each incoming message to a message size limit associated with mobile communication device 116. Messages having a message size within the respective message size limit are moved directly to message portion forwarding module 414 for delivery to mobile communication device 116. Messages having a message size greater than the message size limit are diverted to message parsing module 412.

Message parsing module 412 parses each oversize message into a set of two or more message portions, each message portion having a size at or below the message size limit for the respective recipient. In one application, the first message portion is sent to message portion forwarding module 414 for forwarding to mobile communication device 116, while the remaining portions are sent to message portion return module 416 for return to sender 402. Alternate embodiments may divert the message portions according to alternate schemes.

Figure 5:
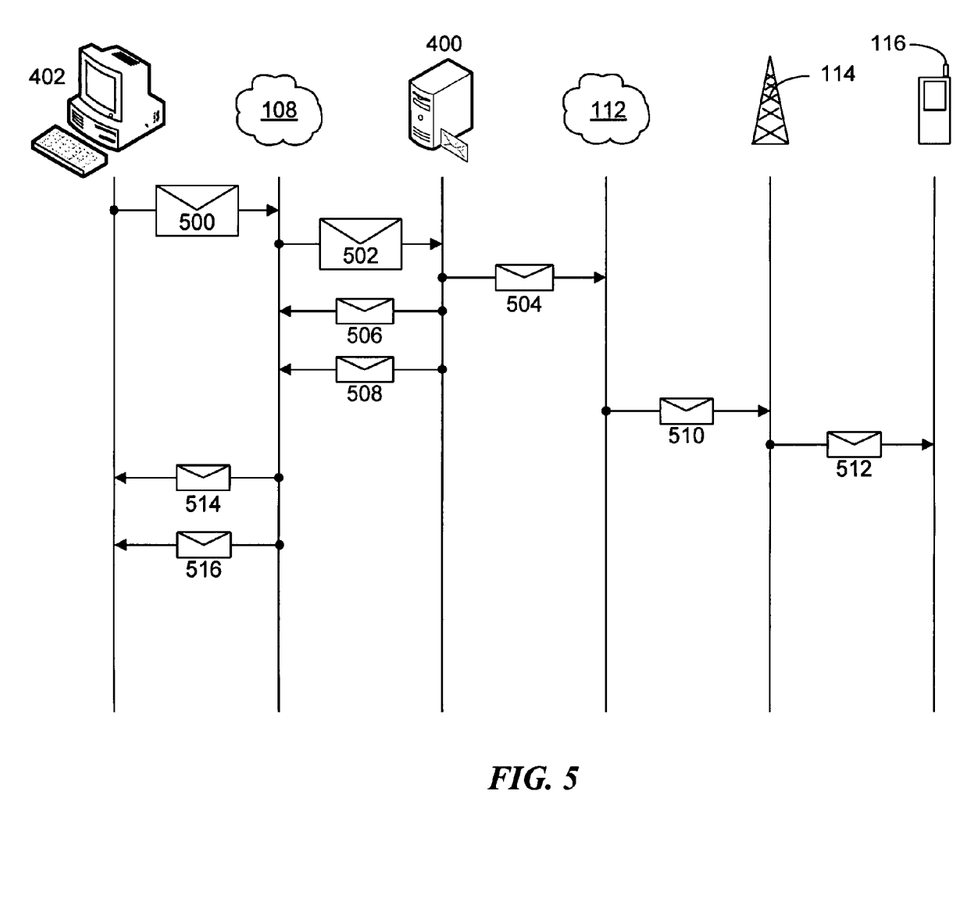
FIG. 5 depicts a message flow diagram illustrating partial forwarding of electronic messages according to one embodiment.

FIG. 5 is a message flow diagram showing the flow of electronic messages to and from the message server 400 depicted in FIG. 4. An oversized electronic message is sent over the internet 108 from sender 402 to message server 400, as represented by messages 500 and 502. Message server 400 receives message 502, identifies that it is an oversized message, and parses it into a first message portion 504, second message portion 506 and third message portion 508. First message portion 504 is forwarded to mobile communication device 116 via wireless network 112, while second and third message portions 506 and 508 are returned to sender 402 via the internet 108. First message portion 504 is forwarded to base station 114 by wireless network 112 as message 510 and from base station 114 to mobile communication device 116 as message 512. In a similar manner, second and third message portions 506, 508 are relayed from the internet 108 back to sender 402, as represented by messages 514, 516.

Figure 6:
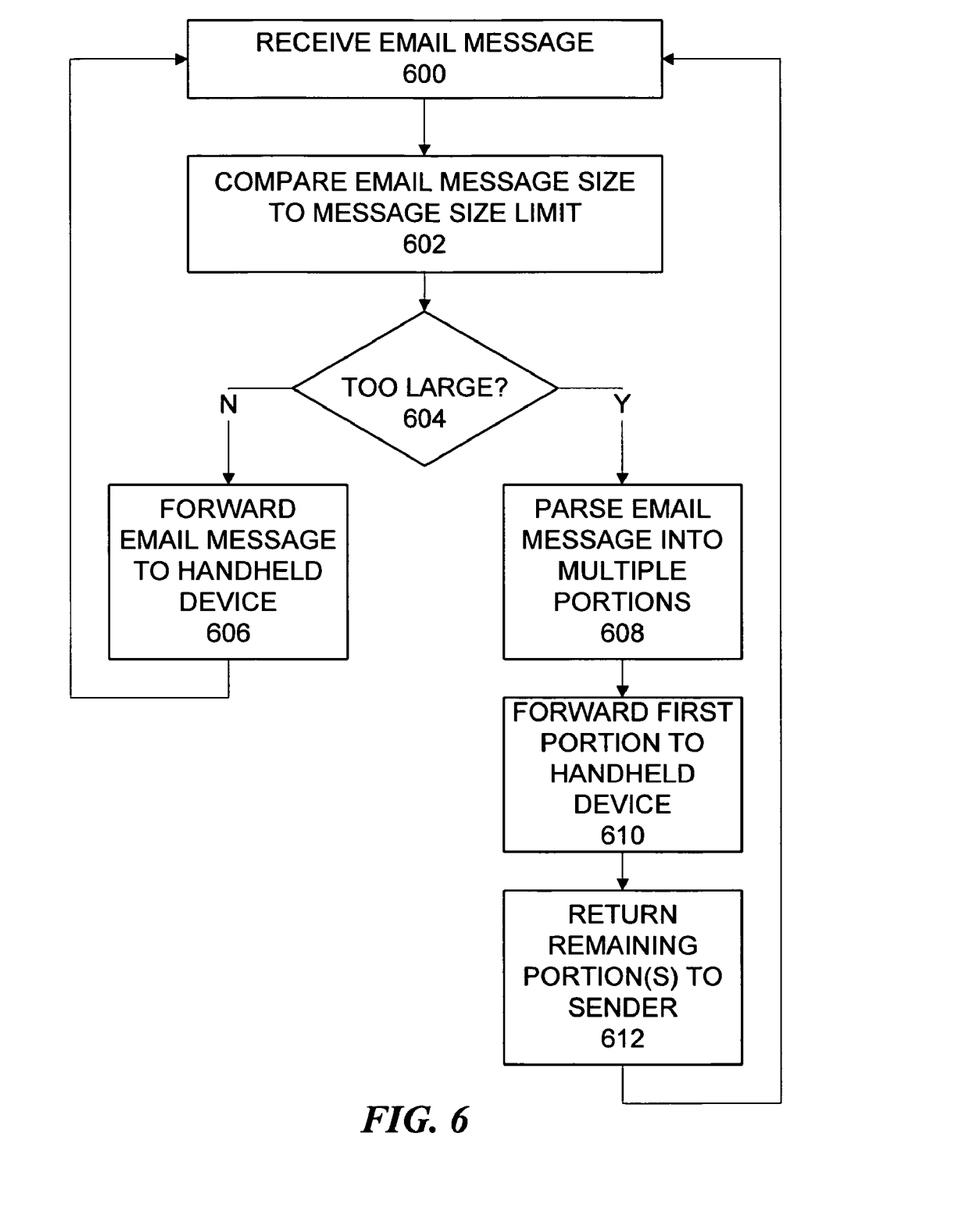
FIG. 6 depicts a flow chart illustrating partial forwarding of electronic messages according to one embodiment.

FIG. 6 depicts a flowchart of one embodiment of the process of message parsing, forwarding and return. An electronic message is first received (block 600). The size of the received electronic message is then compared to a message size limit associated with the recipient (block 602) and a determination is made as to whether the size of the message exceeds the appropriate message size limit (decision block 604). If the size of the message is within the message size limit, the electronic message is forwarded to the mobile communication device associated with the recipient (block 606). If the size of the message exceeds the appropriate message size limit, the electronic message is parsed in multiple message portions (block 608), the first message portion is forwarded to the mobile communication device (block 610), and the remaining message portions are returned to the sender of the electronic message (block 612).

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. An electronic message server comprising:
   a message receipt module operable to receive at least one electronic message having a message size from at least one sender address to at least one recipient address associated with a mobile communication device;
   a message size comparison module operable to compare the message size to at least one message size limit;
   a message parsing module operable to parse at least one message having a message size larger than at least one message size limit into a plurality of portions of the electronic message comprising at least a first portion of the electronic message and at least one remaining portion of the electronic message, each portion of the electronic message having a size within the message size limit;
   a message portion forwarding module operable to forward the first portion of the electronic message to the mobile communication device via a wireless link; and
   a message portion return module operable to return each remaining portion of the electronic message to the sender address associated with the electronic message.

2. The electronic message server as recited in claim 1 wherein the electronic message is an electronic mail message.

3. The electronic message server as recited in claim 1 wherein the message parsing module is operable to parse the electronic message into at least a first message portion, a second message portion and a third message portion.

4. The electronic message server as recited in claim 3 wherein the message portion return module is operable to return the second message portion and third message portion to the sender.

5. The electronic message server as recited in claim 1 wherein the wireless link is selected from a cellular link, a WiFi link, a Bluetooth link, a Zigbee/IEEE 802.15.4 link and an infrared link.

6. The electronic message server as recited in claim 1 wherein at least one message size limit is associated with the mobile communication device.

7. The electronic message server as recited in claim 1 wherein the electronic message is received via the internet.

8. A method of forwarding messages addressed to a recipient address to a mobile communication device associated with the recipient address, the method comprising the steps of:
   receiving from at least one sender address at least one electronic message having a message size;
   comparing the message size to at least one message size limit;
   parsing at least one electronic message having a message size larger than at least one message size limit into a plurality of portions of the electronic message comprising at least a first portion of the electronic message and at least one remaining portion of the electronic message, each portion of the electronic message having a size within the message size limit;
   forwarding the first portion of the electronic message to the mobile communication device via a wireless link; and
   returning each remaining portion of the electronic message to the sender address associated with the electronic message.

9. The method as recited in claim 8 wherein the electronic message is an electronic mail message.

10. The method as recited in claim 8 wherein the electronic message is parsed into at least a first message portion, a second message portion and a third message portion.

11. The method as recited in claim 10 wherein the second message portion and third message portion are returned to the sender.

12. The method as recited in claim 8 wherein the wireless link is selected from a cellular link, a WiFi link, a Bluetooth link, a Zigbee/IEEE 802.15.4 link and an infrared link.

13. The method as recited in claim 8 wherein at least one message size limit is associated with the mobile communication device.

14. The method as recited in claim 8 wherein the electronic message is received via the internet.

15. A mobile communication system comprising:

means for receiving at least one electronic message addressed to a recipient address, having a message size, from at least one sender address;

means for comparing the message size to at least one message size limit;

means for parsing at least one electronic message having a message size larger than at least one message size limit into a plurality of portions of the electronic message comprising at least a first portion of the electronic message and at least one remaining portion of the electronic message, each portion of the electronic message having a size within the message size limit;

means for forwarding the first portion of the electronic message to a mobile communication device associated with the recipient address via a wireless link; and means for returning each remaining portion of the electronic message to the sender address associated with the electronic message.

16. The mobile communication system as recited in claim 15 wherein the means for parsing is operable to parse the electronic message into at least a first message portion, a second message portion and a third message portion.

17. The mobile communication system as recited in claim 15 wherein the means for returning is operable to return the second message portion and third message portion to the sender.

18. The mobile communication system as recited in claim 15 wherein the wireless link is selected from a cellular link, a WiFi link, a Bluetooth link, a Zigbee/IEEE 802.15.4 link and an infrared link.

19. The mobile communication system as recited in claim 15 wherein at least one message size limit is associated with the mobile communication device.

20. The mobile communication system as recited in claim 15 wherein the electronic message is received via the internet.

* * * * *